(12) United States Patent
Ocepek

(10) Patent No.: US 7,570,625 B1
(45) Date of Patent: Aug. 4, 2009

(54) DETECTION OF WIRELESS DEVICES

(75) Inventor: Steven R. Ocepek, Austin, TX (US)

(73) Assignee: TW Acquisition, Inc., Chicago, IL (US)

( * ) Notice: Subject to any disclaimer, the term of this patent is extended or adjusted under 35 U.S.C. 154(b) by 395 days.

(21) Appl. No.: 11/329,786

(22) Filed: Jan. 10, 2006

(51) Int. Cl.
*H04Q 7/00* (2006.01)
(52) U.S. Cl. .................... 370/338; 370/328; 370/310.2; 370/349; 370/310; 455/403; 455/420; 455/423; 455/9
(58) Field of Classification Search .................. 370/338, 370/328, 229, 230, 310, 310.2, 349; 455/422.1, 455/423, 9, 67.11
See application file for complete search history.

(56) References Cited

U.S. PATENT DOCUMENTS

| | | | |
|---|---|---|---|
| 6,957,067 B1 * | 10/2005 | Iyer et al. ................. | 455/435.1 |
| 7,333,481 B1 * | 2/2008 | Rawat et al. ................ | 370/352 |
| 2002/0098855 A1 * | 7/2002 | Hartmaier et al. ........... | 455/466 |
| 2003/0135762 A1 | 7/2003 | Macaulay ................... | 713/201 |
| 2004/0049586 A1 | 3/2004 | Ocepek ...................... | 709/229 |
| 2005/0043051 A1 * | 2/2005 | Takano et al. ................ | 455/522 |
| 2005/0213604 A1 * | 9/2005 | Howe ......................... | 370/463 |
| 2006/0111099 A1 * | 5/2006 | Abdel-Kader ............... | 455/421 |
| 2006/0165073 A1 * | 7/2006 | Gopinath et al. ............ | 370/389 |
| 2006/0193284 A1 * | 8/2006 | Stieglitz et al. ............. | 370/328 |
| 2006/0209700 A1 * | 9/2006 | Sundar et al. ............... | 370/248 |

* cited by examiner

*Primary Examiner*—Huy Q Phan
(74) *Attorney, Agent, or Firm*—Koestner Bertani LLP

(57) ABSTRACT

A method, system, apparatus, and computer-readable medium to determine whether a device having access to a network is wireless. A method for determining whether a device is wireless includes sending a specially-constructed packet to the device via a network. The packet is constructed so that the source address for the packet is a physical address on the network for the device. If the device does not send a response to the packet, a determination is made that the device is wireless. If the device sends a response to the packet, a determination is made that the device is wired. In one embodiment of the invention, the physical address for the device is a Media Access Control (MAC) address. The initial packet may, for example, request the physical address for the device and may be sent in response to detecting a communication to or from the suspect device.

29 Claims, 3 Drawing Sheets

Bridging Wireless Access Point

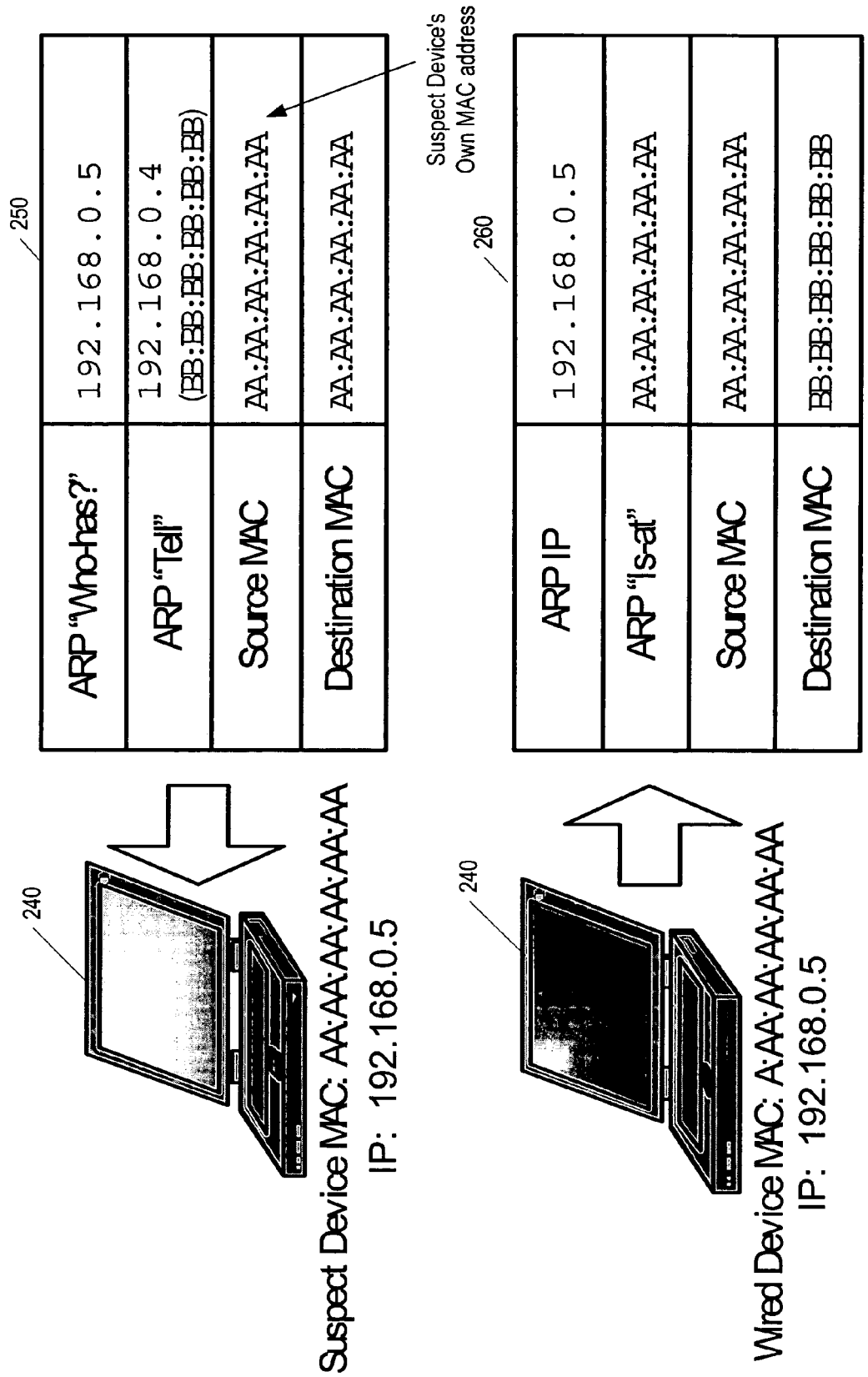
Fig. 2A - Determining whether a Device is Wireless

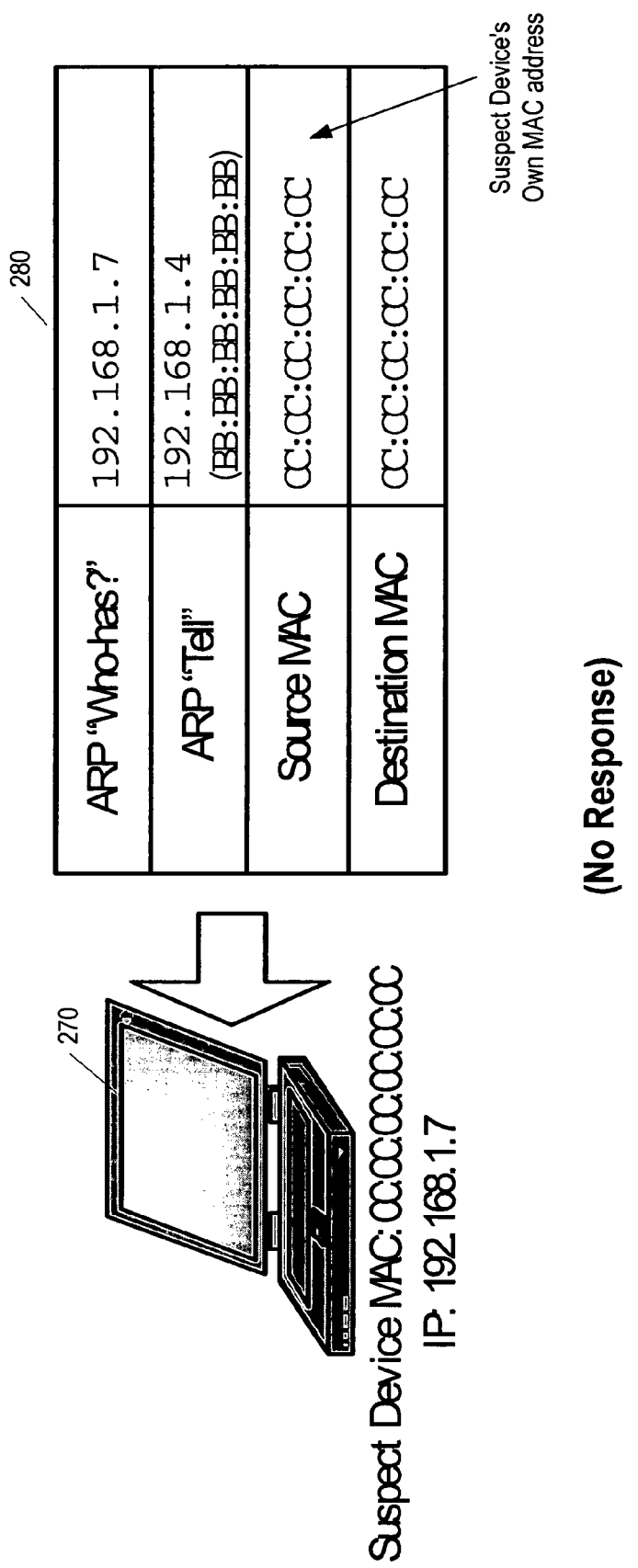
Fig. 2B - Determining whether a Device is Wireless

DETECTION OF WIRELESS DEVICES

FIELD OF INVENTION

This invention, in general, relates to a system and method for determining whether a device having access to a network is wireless.

BACKGROUND OF THE INVENTION

Global networking of computers has greatly affected business. As the number of computers linked to networks grows, businesses increasingly rely on networks to interact. More and more people use electronic mail, websites, various file transfer methods, and remote office applications, among other types of software, to facilitate business transactions and perform job related tasks. Widespread communication of business information between networks via public networks such as the Internet has raised security concerns about possible interception of sensitive information and/or undetected access to internal networks.

Data communicated within an organizational network has been considered to be more secure than data communicated across a public network, because the organization has control of its own network resources. Computer systems on a local area network can deliver data directly to other devices on the same local area network, because a physical infrastructure is shared and is within the organization's control. Delivery of information outside the organizational network has been considered to be less secure because the organization lacks control of resources through which the information travels.

With the introduction of low-cost wireless networking technologies, companies are now more vulnerable to interception and intrusion than ever before. Wireless networking equipment was initially targeted for consumer and home use and therefore was designed to be inexpensive and easy to use with little emphasis on security. However, wireless technology's rapid spread to the corporate environment has introduced security problems. Wireless technology allows devices to communicate without installing cables between the devices. Adding wireless access points to a wired network enables data to be sent from the wired network to the wireless network, and vice versa, as if the wireless devices were physically connected to the wired network.

Wireless access points allow wireless devices to view network traffic and communicate using network resources without being physically connected to the network. The ease of installation of wireless access points enables cheap installation of access points to corporate networks, with little restriction on who installs such access points. Consequently, wireless devices may gain access to the network without necessarily being within an organization's control or even without the organization's knowledge.

Even organizations that do not use wireless devices are susceptible to unauthorized access from the wireless domain. For example, consider an authorized host (computer system) on the network. The authorized host has a valid network address and is connected to the wired network via a switch. However, if the authorized host also has an integrated but unconfigured wireless device, the unconfigured wireless device can expose the network to unauthorized access. The unconfigured wireless device may, for example, send broadcasts into the wireless space, attempting to connect to either a wireless access point or to another wireless host in "ad-hoc" mode. An attacker can watch for these broadcasts and initiate a connection to the unconfigured wireless device by responding to the broadcasts.

For example, assume that an authorized host has a default wireless configuration to connect to an ad-hoc network called "default." After observing a request to connect to the ad-hoc network "default," an attacker can set its own wireless interface card to respond to "default" as well. Once connected to the wireless device on the authorized host, the attacker can initiate a network connection and launch attacks against the authorized host. If the authorized host has enabled a "forwarding" option, thereby providing a routing access point into the wired network, the attacker may also route packets to other hosts on the network via the wireless device of the authorized host.

As another example of vulnerability even though the network does not support wireless access points, only one (perhaps well-meaning) employee can compromise network security. For example, that employee might have a meeting in a location that is not connected to the corporate network. By bringing a personal wireless access point from home, that employee could connect her wireless device to the corporate network inside the building, enabling her to access the corporate network from outside the building. However, that employee may not realize that her wireless device enables other wireless devices to access the network as well. As another example, an employee may wish to use the corporate high-speed Internet connection and install a routing wireless access point that enables her device to connect via the routing wireless access point to share the Internet connection.

In even worse cases, someone with the intent to harm the organization could hide a wireless access point in the building, since some access points are no larger than a paperback novel. Therefore, corporate networks can become compromised from inside the building by misguided employees installing unauthorized access points, malicious hackers hundreds of yards (up to several miles) away, or ordinary people using the company's resources for free Internet access.

Outsiders connecting to the network via a wireless access point cannot be detected or identified easily from within the wired network. However, it is useful to determine whether a given communication originated with, or is targeted to, a wireless device, especially if wireless devices are not authorized to access the network. It is also helpful to be able to distinguish whether a given device is wireless, because an organization may wish to limit or prevent network access by wireless devices. For example, an administrator may wish to restrict wireless devices to access only a particular subnet.

Wireless scanning is one technique that is commonly used to detect wireless devices connected to the wired network and/or rogue wireless access points into the network. Wireless scanning uses a wireless radio, which scans the airwaves for wireless devices and determines whether those wireless devices are connected to the wired network. An example of one product suite that performs wireless scanning is the AirDefense Enterprise suite provided by AirDefense of Alpharetta, Ga.

While wireless scanning is useful in some situations, wireless radios have a limited range of airwaves that can be scanned and cannot detect remote devices outside that limited range. Because devices using a wireless access point can be remote from the network, those remote devices may not be detectable. In addition, wireless radios are sensitive to obstacles and other types of interference with radio waves and may be unable to detect unauthorized access due to interference.

Simple Network Management Protocol (SNMP) scanning is another technique that can be used to detect wireless devices and/or rogue wireless access points into the network. SNMP uses inter-network addresses, such as, but not limited to, Internet Protocol (IP) addresses. With SNMP scanning, queries are sent to the entire network address space in search of SNMP-enabled access points. When a response is received, a determination can be made whether the SNMP-enabled access point is authorized. An example of a product that performs SNMP scanning is WiSentry provided by WiMetrics Corporation of Bellevue, Wash.

While not subject to the same physical limitations as products that use wireless radios, SNMP scanning only detects access points that respond to SNMP queries. Rogue wireless access points, especially wireless bridges, are most often installed without a valid inter-network address (e.g., IP address) because no routing is required to communicate via the wireless bridge. Therefore, most rogue wireless bridges cannot be discovered using SNMP scanning.

Some passive techniques for determining whether a device is wireless take advantage of the fact that wireless networking technologies are typically slower than their wired counterparts (FastEthernet and newer). One such method monitors the response times of specific types of messages. When a device is discovered communicating significantly below the normal response time, a wireless connection may be the cause of the slower connection. However, such a determination is not certain, as other factors such as slower computer systems and slower wireless cards can produce the same effect. Furthermore, as wireless technologies improve, the performance gap between wired and wireless networks is decreasing.

A solution is needed to determine whether a device is wireless. Preferably, the solution should enable determination of whether a device is wireless even though the device is physically remote from the network. Furthermore, the solution should not require communication with the device via a particular protocol or a specific type of addressing scheme.

SUMMARY OF THE INVENTION

Features of the invention may be found in a system, method, computer-readable medium, and apparatus that determine whether a device is wireless.

In one feature of the invention, a method for determining whether a device is wireless includes sending a packet to the device via a network. The packet is constructed so that the source address for the packet is a physical address on the network for the device. If the device does not send a response to the packet, a determination is made that the device is wireless. If the device sends a response to the packet, a determination is made that the device is wired.

In one embodiment of the invention, the physical address for the device is a Media Access Control (MAC) address. The initial packet may, for example, request the physical address for the device. In one embodiment, the packet is sent in response to a determination that the device has been sent information via the network. In another embodiment, the packet is sent in response to a determination that the device has sent information via the network.

In one embodiment, the method further includes inferring that a wireless access point is providing the wireless device with access to the network and querying one or more network devices to find a network connection to the wireless device. The method may further include disabling the wireless access point. In other embodiments, if the device is wireless, access by the device to the network may be limited or prevented.

A system, apparatus, and computer-readable medium for determining whether a device having access to a network is wireless are also described. Other aspects, advantages and novel features of the present invention will become apparent from the detailed description of the invention when considered in conjunction with the accompanying drawings.

BRIEF DESCRIPTION OF THE DRAWINGS

For a more complete understanding of the present invention and advantages thereof, reference is now made to the following description taken in conjunction with the accompanying drawings in which like reference numbers indicate like features.

FIGS. 2A and 2B show a technique for determining whether a device is wireless in accordance with one embodiment of the invention.

DETAILED DESCRIPTION

Figure 1:
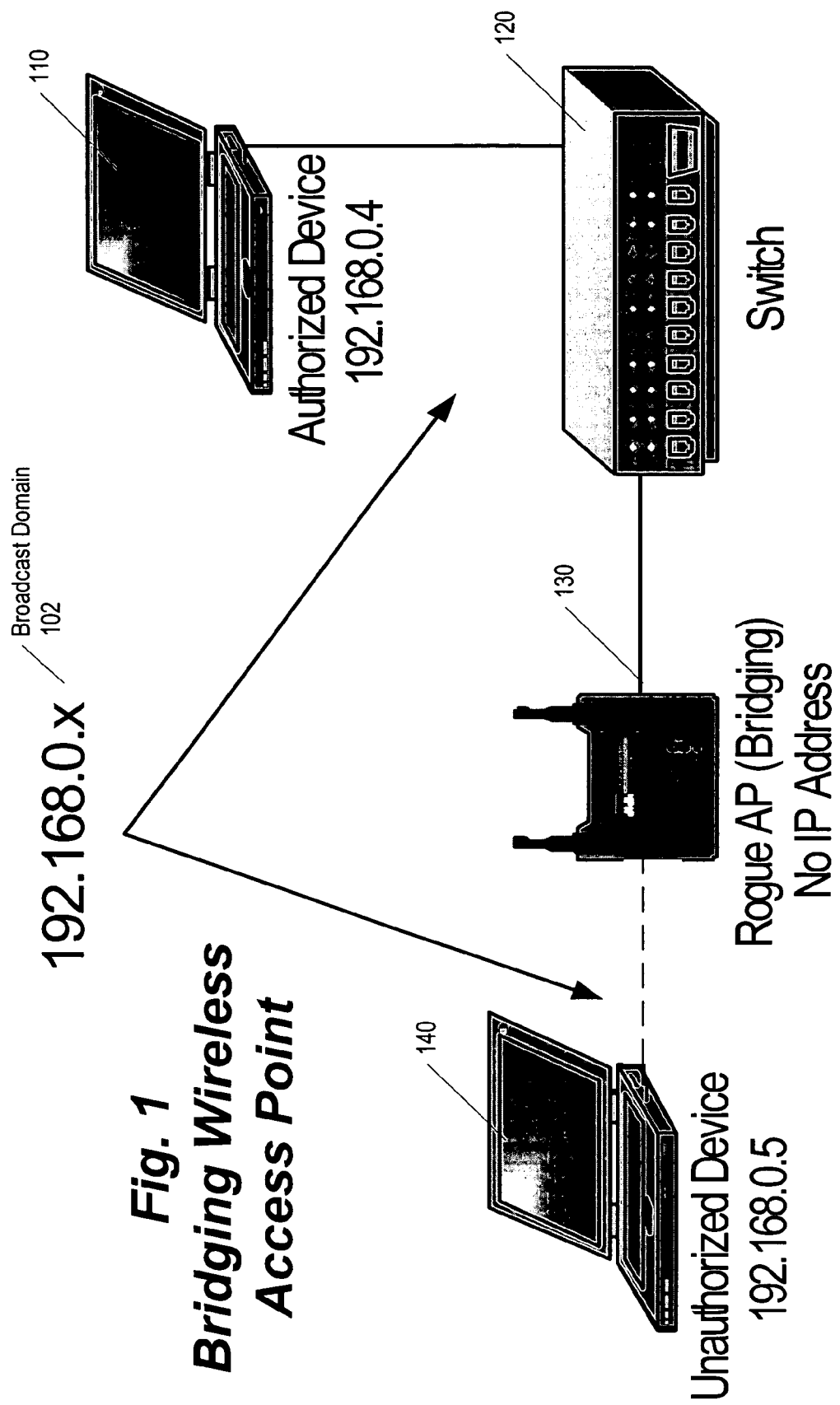
FIG. 1 shows an environment in which an unauthorized device has gained access to a network via a rogue wireless access point.

The techniques and systems described herein enables a determination to be made whether a device having access to a network is wireless. If a wireless device is accessing the network, an inference can be made that a wireless access point is providing a connection from the wireless space into the wired network. As mentioned previously, wireless access points easily can be physically connected to the network, thereby enabling various wireless devices to access and communicate using the network without detection or authorization.

Background information about network communication and the problem of determining whether a device is wireless are provided, followed by a discussion of embodiments of the invention. Most data today is sent, using digital signals, over networks that use packet-switching (as opposed to circuit-switching, where a path typically is dedicated to communication between two or more parties). Using packet-switching, all network users can share the same paths at the same time and the particular route a data unit travels can be varied as conditions change. In packet-switching, a message is divided into packets, which are units of a certain number of bytes. The network addresses of the sender and of the destination are added to the packet. Each network node looks at the packet to see where to send the packet next. Packets in the same message may travel different routes and may not arrive in the same order that they were sent. At the destination, the packets in a message are collected and reassembled into the original message.

The following description includes some terminology defined by the standard model for network programming, Open Systems Interconnection (OSI). OSI is a standard description or "reference model" for how messages should be transmitted between any two points in a telecommunication network. The main idea in OSI is that the process of communication between two end points in a telecommunication network can be divided into layers, with each layer adding its own set of special, related functions. Traditionally, the layers are described as follows: layer 1—physical layer; layer 2—data link layer; layer 3—network layer; layer 4—transport layer; layer 5—session layer; layer 6—presentation layer; and layer 7—application layer. Each communicating user or program is at a computer equipped with these seven layers of functionality.

In a given message between users, data flows through each layer at one end down through the layers in that computer. At the other end, when the message arrives, data flows up through the layers in the receiving computer and ultimately to the end user or program. The actual programming and hardware that furnishes these seven layers of function is usually a combination of the computer operating system, applications (such as a Web browser), TCP/IP or alternative transport and network protocols, and the software and hardware that enable a host computer to send a signal on one of the telecommunication lines attached to the host computer.

The upper layers of the OSI model deal with application issues and generally are implemented only in software. The highest layer, the application layer, is closest to the end user. Both users and application layer processes interact with software applications that contain a communications component. The lower layers of the OSI model handle data transport issues. The physical layer and the data link layer are implemented in hardware and software. The lowest layer, the physical layer, is closest to the physical network medium (the network cabling, for example) and is responsible for actually placing information on the medium and conveying a bit stream through the network at the electrical and mechanical level.

Different layers of the OSI model may have addresses in different formats, although an address in one format can be converted into an address in the format for an adjacent layer. For example, a conversion from a physical address on a physically-interconnected network segment to an inter-network layer 3 address has historically been performed in the Internet Protocol using Address Resolution Protocol (ARP). Address Resolution Protocol (ARP) is a protocol for mapping an inter-network address (such as an IP address) to a physical device address that is recognized within a local network. For example, in IP Version 4, the most common level of IP in use today, an address is 32 bits long. In an Ethernet local area network, however, addresses for attached devices are 48 bits long. (The physical device address is also known as a Media Access Control or MAC address.) A table, usually called the ARP cache, is used to maintain a correlation between each MAC address and its corresponding IP address. ARP provides the protocol rules for making this correlation and providing address conversion in both directions.

When an incoming packet destined for a host device on a particular local area network arrives at a gateway to that LAN, the gateway asks the ARP program to find a physical (e.g., MAC) address that matches the inter-network (e.g., IP) address in the incoming packet. The ARP program looks in the ARP cache and, if the ARP program finds the inter-network (e.g., IP) address, the ARP program provides the inter-network address so that the packet can be converted to the right packet length and format and sent to the device. If no entry is found in the ARP cache for the inter-network address, the ARP program broadcasts a request packet in a special format to all the devices in the broadcast domain to see if one device recognizes the inter-network address as its own. A device that recognizes the inter-network address as its own returns a reply that it owns the inter-network address. ARP updates the ARP cache for future reference and then sends the packet to the MAC address of the device that replied. Since protocol details differ for each type of local area network, ARP requests may be in different formats, such as for Ethernet, Asynchronous Transfer Mode, Fiber Distributed-Data Interface, High Performance Parallel Interface, and other protocols.

Internet Protocol version 6 also includes a Neighbor Discovery (ND) Protocol that enables a layer 2 address to be determined from a network layer 3 address. Other protocols that provide the functionality of converting an address for one layer into the format for another layer are considered to be included within the scope of the invention.

Devices on networks communicate using the concept of broadcast domains. A broadcast domain can be thought of as a restricted area in which information can be transmitted for all devices in the broadcast domain to receive. For example, any devices attached to a traditional coaxial cable Ethernet LAN can transmit frames to any other device connected to the Ethernet LAN because the medium is a shared transmission system. The shared transmission system provides a single broadcast domain that is shared by all the devices attached to the shared transmission medium. When a device initially connects to a network, typically the device broadcasts its own physical address to other devices in the broadcast domain.

Frames are normally addressed to a specific destination device on the Ethernet network. While all devices detect the frame transmission on the Ethernet network, only the device to which the frame is addressed actually receives the frame. A special broadcast address containing all ones is used to send frames to all devices on the Ethernet network. For example, this special broadcast address is used when a device initially connects to the network to broadcast the new device's physical address.

A broadcast domain may include a variety of devices through which information flows, such as routers, switches, and bridges. The role of each type of device with regard to processing messages is briefly described here. If multiple network segments are connected with routers, the router forms the boundary of each network segment's broadcast domain. Broadcast traffic does not cross routers, although most routers can be configured to forward specific broadcast traffic.

Network switches are multipoint connection devices that provide a point of attachment for a single computer or another device (hub or switch) that has multiple computers attached to it. A device attached to one port of the switch can directly communicate with a device on another port of the switch over what is essentially a private link. Network switching reduces or removes the sharing of the physical transmission medium and the problems that result from sharing, such as contention (when devices wait to use the shared transmission cable), collisions (when two devices attempt to use the cable at the same time), and delays caused by contention and collisions.

A bridge is a device that connects a network segment to another network segment. Bridged network segments may be configured differently (for example, a network segment using Ethernet can be bridged with a network segment using Token Ring or with a wireless network segment). Some bridges have intelligence built in and are referred to as "learning bridges." A learning bridge determines whether a message from one user to another is going to the network segment containing the bridge or to another network segment. The learning bridge passes messages to addresses known to be on an interconnected segment through a port on the bridge that is connected to that other interconnected segment.

A broadcast domain may include one or more network segments connected by bridges and/or switches. Bridged networks are typically physically-interconnected local area networks (LANs) since broadcasting every message to all possible destinations would flood a larger network with unnecessary traffic. Each node or device has a physical address; one common format of a physical address is a Media Access Control (MAC) address. Learning bridges learn which physical (e.g., MAC) addresses are on which network segment (e.g., which port on the bridge that is connected to that network segment). The learning bridge develops an address table indicating physical (MAC) addresses associated with each bridge port so that subsequent messages can be sent via the correct bridge port to the appropriate network segment. A bridge sends a data frame from one network segment to the next network segment along the communications path.

Bridges and switches operate at the data-link layer (layer 2) of the network (bridges and switches can optionally operate at higher layers in addition to Layer 2). A layer 2 switch looks at each packet or data unit and determines from a physical address (e.g., the MAC address) which device a data unit is intended for and sends the data unit via a switch port toward that device. A layer 2 switch maintains a table, often referred to as a switching table, which contains a list of devices that are known to exist somewhere beyond the switch's ports. A switching table is one example of a form of storing relationships between ports and physical addresses. Other forms that correlate a switch port with a destination physical (e.g., MAC) address, such as a forwarding database or content-addressable memory (CAM) table, are within the scope of the invention.

Bridges maintain a similar address table that correlates a bridge port with physical (e.g., MAC) addresses. Because bridges and layer 2 switches are not involved in routing between networks, bridges and layer 2 switches do not maintain address resolution tables (e.g., ARP tables) with inter-network (e.g., IP) addresses.

While bridging wireless access points are very convenient, bridging wireless access points can be used to access a network without authorization. Furthermore, bridging wireless access points are difficult to detect. The technique described herein enables a determination to be made that a device is using a bridging access point that is providing wireless access to a network.

FIG. 1 is a diagram showing access to a network by an unauthorized device via a bridge providing a wireless access point to the network. A broadcast domain 102, corresponding to IP addresses 192.168.0.x, includes an authorized device 110 having IP address 192.168.0.4, a switch 120, and a rogue access point 130 in communication with switch 120. Rogue access point 130 may be, for example, plugged into broadcast domain 102 via an Ethernet cable interface intended for use by a client computer system. Rogue access point 130 provides a bridge into broadcast domain 102 from the wireless space. Neither switch 120 nor bridging rogue access point 130 is assigned its own inter-network (IP) address. The bridging rogue access point 130 cannot be detected by hosts within wired broadcast domain 102, even though a device (e.g., unauthorized device 140) connecting to broadcast domain 102 via bridging rogue access point 130 has the same access to broadcast domain 102 as a wired device (e.g., authorized device 110) and shares the same address space.

Bridging rogue access point 130 provides unauthorized device 140 with access to broadcast domain 102 at the data-link network layer (layer 2) in the OSI model. Data link layer access enables unauthorized device 140 to communicate via the layer 2 protocol (such as Address Resolution Protocol (ARP)) with other devices on broadcast domain 102. Communication within a broadcast domain is trusted communication, and devices maintain address resolution tables (e.g., ARP tables) of other addresses with which the respective device can communicate. Such an address resolution table includes a physical address on the network segment (the MAC address, which is a layer 2 address), and an Internet Protocol address, which is a layer 3 (network layer) address.

Once unauthorized device 140 connects with rogue access point 130 and has access to broadcast domain 102, unauthorized device 140 may send a request to a configuration server (not shown) on the network, requesting the configuration server to assign an inter-network (IP) address on broadcast domain 102 that unauthorized device 140 can use. Because layer 2 communication is trusted communication, the configuration server may be unable to determine that the requester is not authorized to access broadcast domain 102. In the example, the configuration server has assigned IP address 192.168.0.5 to unauthorized device 140. After gaining access to broadcast domain 102, unauthorized device 140 can pose as an authorized device and cause other devices on broadcast domain 102 to send communications to unauthorized device 140. By posing as an authorized device, unauthorized device 140 "poisons" the other devices' address resolution tables (e.g., ARP) of other addresses for communication. When unauthorized device 140 is targeted as a recipient of a communication from another device within broadcast domain 102, bridging rogue access point 130 can redirect the communication into the wireless space. This redirected communication can then be intercepted by others who are monitoring wireless transmissions. Because most rogue access points are deployed without encryption, these redirected communications are not encrypted and can be read by any interceptor of the wireless transmission.

FIGS. 2A and 2B show a technique for determining whether a device is wireless in accordance with one embodiment of the invention. Because wireless devices use radio waves to communicate, a wireless device may receive its own traffic when a signal is reflected from an object on the transmission path. It has been determined that a wireless device ignores a message that has its own physical (e.g., MAC) address as the source address. The term 'packet' is used herein to describe any type of data unit, message or frame sent via a layer equivalent to the OSI model data-link layer of the network. A failure to respond to a packet having the recipient's own physical address as the source address is associated with a wireless device.

Referring to FIG. 2A, consider a device 240 that is suspected of either being an intruding device or having a connection to an intruding device. For example, a device may become suspect when the device either sends or receives information via a network and the device is unrecognized by a suspect-identifying sub-system, means, module, and/or instructions (not shown in FIG. 2A). A suspect-identifying sub-system, means, module, and/or instructions may be implemented in hardware, software, and/or firmware, as can all of the subsequently described sub-systems, means, modules, and/or instructions to implement functionality of the claimed invention. In one embodiment, the suspect-identifying sub-system need not operate in-line with network communication. For example, the suspect-identifying functionality can be implemented by a sub-system that watches for broadcast packets, which are observable by any system connected to the network. ARP requests are one example of a type of broadcast packet that can be used to identify suspect devices.

In response to identifying a suspect device, a specially-constructed packet 250 can be formulated and sent to suspect device 240 to observe the response. This packet is formulated using information about how devices communicate at the data-link and network layers (layers 2 and 3). The packet may be formulated by a packet-formulating sub-system, means, module, and/or instructions (not shown in FIG. 2A).

As described above, a device maintains an address resolution table (such as an ARP table) of other addresses with which that device can communicate. An address resolution table provides a mapping of physical network addresses (e.g., MAC addresses) to layer 3 (e.g., IP) network addresses. In this example, suspect device 240 has a MAC address of AA:AA:AA:AA:AA:AA and an IP address of 192.168.0.5.

Packet 250 is formulated and sent to suspect device 240 to observe the response. The source address of packet 250 is initialized to the suspect device's MAC address AA:AA:AA: AA:AA:AA rather than to the MAC address of the sender. Other than this difference, packet 250 is a normal packet. Packet 250 contains an ARP request message that asks suspect device 240 to identify the MAC address that corresponds to the 192.168.0.5 IP address, which is the suspect device 240's own IP address. Packet 250 requests that the response to the ARP request be sent to a known address (having IP address 192.168.0.4 and MAC address BB:BB:BB:BB:BB: BB). The destination address in packet 250 is initialized with the destination address of the suspect device, AA:AA:AA: AA:AA:AA, and packet 250 is sent. Packet 250 may be sent, for example, by a packet-sending sub-system, module, means, and/or instructions. Determining whether or not a response has been made to the specially-formulated packet can be performed by a response-determining sub-system, module, means, and/or instructions.

In the example of FIG. 2A, suspect device 240 responds to packet 250, indicating that suspect device 240 is not a wireless device. Packet 260 provides the IP address 192.168.0.5 corresponding to its own IP address and having a response indicating that IP address belongs to MAC address AA:AA: AA:AA:AA:AA, which is its own MAC address. The source address for packet 260 corresponds to its own MAC address, AA:AA:AA:AA:AA:AA and packet 260 is sent to a destination MAC address of BB:BB:BB:BB:BB:BB (corresponding to the response address indicated in the ARP "Tell" field of packet 250). Upon detecting a response to packet 250, the response-determining sub-system, means, module, and/or instructions can make a determination that the response was made. In response to this determination, the response-determining sub-system, means, module, and/or instructions, or a separate a type-determining sub-system, means, module, and/or instructions, can make a determination that suspect device 240 is wired.

Referring to FIG. 2B, a suspect device 270 is sent a similar packet 280. Packet 280 contains a source physical address of CC:CC:CC:CC:CC:CC, which is the physical address for suspect device 270. Packet 280 can be sent by the same packet-formulating sub-system, module, means, and/or instructions as described with reference to FIG. 2A. Packet 280 is sent to IP address 192.168.1.7, and a response is requested to be sent inter-network address 192.168.1.4 (with a physical address of BB:BB:BB:BB:BB:BB). Packet 280 is sent to the destination physical address for suspect device 270, CC:CC:CC:CC:CC:CC. Packet 280 can be sent by the same packet-sending sub-system, module, means, and/or instructions as described with reference to FIG. 2A.

The response-determining sub-system, means, module, and/or instructions described with reference to FIG. 2A can determine that no response to packet 280 is received. Such a determination can be made, for example, if a pre-determined amount of time elapses without a response. When a determination is made that no response has been received, the type-determining sub-system, means, module, and/or instructions described with reference to FIG. 2A can make a determination that suspect device 270 is wireless. Upon making a determination that suspect device 270 is wireless, various corrective measures can be taken. For example, an attempt to identify the wireless access point that is providing access to the network by wireless device 270 can be made.

Because a bridge or a switch does not have an inter-network (IP) address, the technique described with reference to FIGS. 2A and 2B does not directly discover the bridge's or switch's connection to the network. Nevertheless, given the information that a suspect device (here wireless device 270) is wireless (due to the fact that no response to the packet was seen), the existence of a wireless access point can be inferred. Inferring that the wireless access point exists can be performed by an inferring sub-system, module, means, and/or instructions. To find the wireless access point, at least one network device, such as a network switch, can be queried. A network connection to the wireless device can be located by a connection-locating sub-system, means, module, and/or instructions. For example, in networks having "intelligent switches," each intelligent switch that handles a packet records the physical (MAC) address of the sender. Each intelligent switch in the network can be queried until a switch having a port with only the physical (MAC) address of the suspect device is found.

Because the switch will maintain a switching table of ports on the switch to physical addresses, the switch can be queried for the suspect device's physical address. The switch can be queried by a switch-querying sub-system, means, module, and/or instructions. The physical address corresponding to the switch port will indicate the port to which the wireless access point is attached. The port can be identified by a port-identifying sub-system, module, means, and/or instructions. In response to identifying the port, the rogue wireless access point can then be disabled, such as by physically removing the access point from the switch's port. The physical removal of the rogue wireless access point may be performed manually by an administrator or may be automated as an access-point-disabling sub-system, module, means, and/or instructions.

Alternative corrective measures may also be taken in response to determining that an unauthorized wireless device has gained access to the network. For example, access to the network by the suspect device may be limited by an access-limiting sub-system, module, means, and/or instructions. Alternatively, access to the network by the suspect device can be prevented by an access-preventing sub-system, module, means, and/or instructions.

The wireless determination techniques of the present invention provide many advantages. By sending specially-crafted messages to a suspect device, a determination can be made whether the suspect device is wireless. This determination can be made, for example, from within the network without the limitations of using a wireless radio and without depending upon the suspect device communicating via a specific protocol, such as SNMP. The determination can be made more reliably than using traditional methods that rely upon the time required to communicate a message. Information about whether a device is wireless can be used to discover wireless access points that have previously been undetectable.

OTHER EMBODIMENTS

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing media include recordable media such as floppy disks and CD-ROM, transmission type media such as digital and analog communications links, as well as media storage and distribution systems developed in the future.

The above-discussed embodiments may be implemented by software modules or sub-systems that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably, or remotely coupled to a microprocessor/memory system. Thus, the modules may be stored within a computer system memory to configure the computer system to perform the functions of the module. Other new and various types of computer-readable storage media may be used to store the modules discussed herein.

A system, method, apparatus and computer-readable medium have been described to determine whether a device is wireless. Determining whether a device is wireless facilitates the detection of unauthorized wireless access points into a network. In view of the above detailed description of the present invention and associated drawings, other modifications and variations will now become apparent to those skilled in the art. It should also be apparent that such other modifications and variations may be effected without departing from the spirit and scope of the present invention as set forth in the claims which follow.

What is claimed is:

1. A method comprising:
    sending a packet to a device via a network, wherein
        the packet comprises a source address, and
        the source address is a physical address on the network for the device;
    if the device does not send a response to the packet, determining that the device is wireless.

2. The method of claim 1, wherein
    the physical address is a MAC address.

3. The method of claim 1, wherein
    the sending of the packet is performed in response to a determination that the device has been sent information via the network.

4. The method of claim 1, wherein
    the sending of the packet is performed in response to a determination that the device has sent information via the network.

5. The method of claim 1 further comprising:
    if the device is wireless, querying at least one network device to identify a network connection to the device; and
    using the network connection to locate a wireless access point associated with the network connection.

6. The method of claim 5 further comprising:
    disabling the wireless access point.

7. The method of claim 1 further comprising:
    if the device is wireless, limiting access to the network by the device.

8. The method of claim 1 further comprising:
    if the device is wireless, preventing access to the network by the device.

9. The method of claim 1 further comprising:
    formulating the packet such that the source address is the physical address on the network for the device and the packet includes a request message that asks the device to identify an address that corresponds to the device's IP address.

10. The method of claim 1 further comprising:
    if the device sends the response, determining that the device is wired.

11. A system comprising:
    packet-sending means for sending a packet to a device via a network, wherein
        the packet comprises a source address, and
        the source address is a physical address on the network for the device;
    response-determining means for determining whether the device sends a response to the packet; and
        type-determining means for determining that the device is wireless if the device does not send the response.

12. The system of claim 11 wherein
    the type-determining means determines that the device is wired if the device does send the response.

13. The system of claim 11 further comprising:
    suspect-identifying means to identify the device as a suspect device if one of the following is true:
        the device has been sent information via the network; and
        the device has sent information via the network.

14. The system of claim 11 further comprising:
    querying means for querying at least one network device to identify a network connection to the device if the device is wireless; and
    using means for using the network connection to locate a wireless access point associated with the network connection.

15. The system of claim 14 further comprising:
    disabling means for disabling the wireless access point.

16. The system of claim 11 further comprising:
    formulating means for formulating the packet such that the source address is the physical address on the network for the device and the packet includes a request message that asks the device to identify an address that corresponds to the device's IP address.

17. A computer-readable medium comprising computer instructions for execution on a processor, wherein the instructions comprise:
    packet-sending instructions configured to send a packet to a device via a network, wherein
        the packet comprises a source address, and
        the source address is a physical address on the network for the device;
    response-determining instructions configured to determine whether the device sends a response to the packet; and type-determining instructions configured to determine that the device is wireless if the device does not send the response.

18. The computer-readable medium of claim 17 wherein the type-determining instructions are configured to determines that the device is wired if the device does send the response.

19. The computer-readable medium of claim 17 further comprising:
suspect-identifying instructions configured to identify the device as a suspect device if one of the following is true:
the device has been sent information via the network; and
the device has sent information via the network.

20. The computer-readable medium of claim 17 further comprising:
querying instructions configured to query at least one network device to identify a network connection to the device if the device is wireless; and
using instructions configured to use the network connection to locate a wireless access point associated with the network connection.

21. The computer-readable medium of claim 20 further comprising:
disabling instructions configured to disable the wireless access point.

22. The computer-readable medium of claim 17 further comprising:
formulating instructions configured to formulate the packet such that the source address is the physical address on the network for the device and the packet includes a request message that asks the device to identify an address that corresponds to the device's IP address.

23. A computer system comprising:
a processor for executing instructions; and
the computer-readable medium of claim 17.

24. A system comprising:
a packet-sending module configured to send a packet to a device via a network, wherein the packet comprises a source address, and
the source address is a physical address on the network for the device;
a response-determining module configured to determine whether the device sends a response to the packet; and
a type-determining module configured to determine that the device is wireless if the device does not send the response.

25. The system of claim 24 wherein
the type-determining module is configured to determine that the device is wired if the device does send the response.

26. The system of claim 24 further comprising:
a suspect-identifying module configured to identify the device as a suspect device if one of the following is true:
the device has been sent information via the network; and
the device has sent information via the network.

27. The system of claim 24 further comprising:
a querying module configured to query at least one network device to identify a network connection to the device if the device is wireless; and
a using module configured to use the network connection to locate a wireless access point associated with the network connection.

28. The system of claim 27 further comprising:
a disabling module configured to disable the wireless access point.

29. The system of claim 24 further comprising:
a formulating module configured to formulate the packet such that the source address is the physical address on the network for the device and the packet includes a request message that asks the device to identify an address that corresponds to the device's IP address.

* * * * *